(No Model.)
G. R. BOOTH.
MOUNT FOR PICTURES OR PHOTOGRAPHS.
No. 561,480. Patented June 2, 1896.
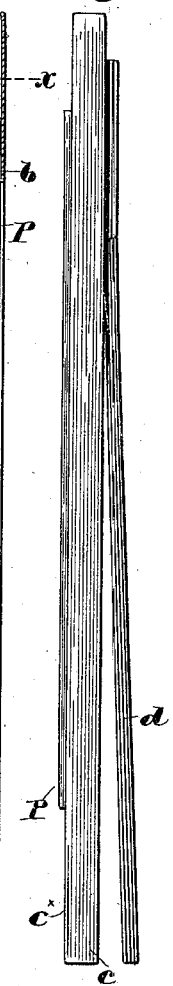
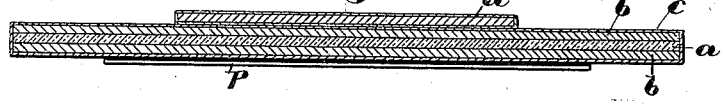
Witnesses:
Walter E. Lombard
A. C. Harmon.
Inventor:
George R. Booth,
by Crosby & Gregory,
Attys.

UNITED STATES PATENT OFFICE.

GEORGE R. BOOTH, OF BOSTON, MASSACHUSETTS, ASSIGNOR TO ARTHUR A. GLINES, OF SAME PLACE.

MOUNT FOR PICTURES OR PHOTOGRAPHS.

SPECIFICATION forming part of Letters Patent No. 561,480, dated June 2, 1896.

Application filed February 24, 1896. Serial No. 580,389. (No model.)

*To all whom it may concern:*

Be it known that I, GEORGE R. BOOTH, of Boston, county of Suffolk, State of Massachusetts, have invented an Improvement in Mounts for Pictures and Photographs, of which the following description, in connection with the accompanying drawings, is a specification, like letters on the drawings representing like parts.

This invention has for its object the production of a simple, cheap, and effective mount for pictures and photographs, the construction being such that the mounted picture has the appearance of being inclosed in an ornamental frame.

Figure 1 is a front view of a mount embodying my invention, partially broken out, and showing a picture secured to the face of the mount. Fig. 2 is a side view of the mount shown in Fig. 1. Fig. 3 is a transverse section taken on the line $x$ $x$, Fig. 1.

The mount shown in Figs. 1 to 3, inclusive, comprises a plate of glass $a$, held between two layers or sheets $b$ $b'$ of fibrous material, such as pasteboard, and about the whole is cemented or otherwise attached a flexible covering $c$, ornamental in character, and which may be stamped or embossed paper, thin leatheroid, &c. The glass gives rigidity and stiffness to the mount, while the fibrous material acts as a buffer to prevent breakage, as by a slight fall or a blow, and the covering $c$ completely conceals the character of the interior construction.

At the back of the mount I prefer to attach by glue or cement a hinged rest or support $d$, so that the mount may be tilted as an easel when set up.

To the front of the mount the picture or photograph P is cemented, the mount being sufficiently larger than the picture to leave exposed to view a surrounding border or margin $c^x$ of the ornamental cover at the face of the mount. This gives the mounted picture the appearance of having a frame around it, and the picture conceals the inner edges of the cover $c$, so that the face of the mount need not be highly finished inside the space to be occupied by the picture.

Photographers find themselves burdened with a large number of negatives, and these plates of glass are after a certain time usually broken up and sold, in order to prevent the negatives from falling into the hands of persons who might put them to improper uses.

In practicing my invention I have found that the old negatives are well adapted for forming the mount as described to give the necessary stiffness thereto without undue weight, and thus the stock of old negatives may be turned to practical account.

Photographs, either card-mounted or on glass, may be employed equally well on my novel mount, which is fully as serviceable and equally as effective as a frame for the picture, and it is a great deal cheaper.

Various kinds of material may be used for the ornamental cover for the mount, according to taste and circumstances.

Having fully described my invention, what I claim, and desire to secure by Letters Patent, is—

A photographic mount comprising a plate of glass, a layer of fibrous material applied to each side of said glass, a flexible ornamental cover inclosing said superimposed glass and fibrous material, and a hinged support attached to the back of the mount, and a picture secured to the front of the mount to leave a surrounding border or frame of the ornamental cover, substantially as described.

In testimony whereof I have signed my name to this specification in the presence of two subscribing witnesses.

GEORGE R. BOOTH.

Witnesses:
JOHN C. EDWARDS,
AUGUSTA E. DEAN.